United States Patent [19]

Mastromatteo

[11] Patent Number: 4,513,194

[45] Date of Patent: Apr. 23, 1985

[54] METHODS OF WELDING

[76] Inventor: Michael Mastromatteo, 61 Suffern La., Garnerville, N.Y. 10923

[21] Appl. No.: 244,153

[22] Filed: Mar. 16, 1981

Related U.S. Application Data

[63] Continuation-in-part of Ser. No. 956,229, Oct. 30, 1978, Pat. No. 4,265,389.

[51] Int. Cl.³ .............................................. B23K 15/00
[52] U.S. Cl. ............................. 219/121 EC; 219/158; 219/161
[58] Field of Search ............... 219/121 EC, 121 ED, 219/121 EB, 121 EM, 158, 161, 101, 104, 106; 228/219, 220, 221, 182, 184; 73/715–729; 29/157 R; 138/26, 30

[56] References Cited

U.S. PATENT DOCUMENTS

| | | | |
|---|---|---|---|
| 1,550,651 | 8/1925 | Charter | 219/161 |
| 3,734,387 | 5/1973 | Sannipoli | 228/184 X |
| 4,120,206 | 10/1978 | Rud, Jr. | 73/718 |
| 4,162,692 | 7/1979 | Greer et al. | 138/30 |
| 4,172,387 | 10/1979 | Ezekiel et al. | 73/719 |
| 4,291,218 | 9/1981 | Myhre | 219/121 EC |

FOREIGN PATENT DOCUMENTS 1218021  1/1971  United Kingdom ............... 219/104

*Primary Examiner*—C. L. Albritton

[57] ABSTRACT

Disclosed is a method of welding a diaphragm to the housing sections of a diaphragm-controlled device. The diaphragm and housings are first clamped together to provide a component of force perpendicular to the areas or seat of the housing which hold the diaphragm. An electron beam directed at, above, and below the sandwich edge of the housing and diaphragm causes a weld to be formed in a portion of the seat. The clamping pressure and expansion of the liquified metal forces part of the metal out of the sandwiched area such that, upon cooling, the housings are brought together against the diaphragm in a secure and pressure-tight weld. In order to weld in a vacuum chamber, it is necessary to remove the gases in the chamber. Diaphragm devices are characterized by the housing having a cavity therein and the diaphragm dividing the cavity into two chambers. Gas evacuation and re-introduction must be controlled to avoid unwanted diaphragm distortion. This is accomplished by providing portals into the housing chambers which are proportional to the volumes therein. The gases thereby pass into and out of the chambers at a rate proportional to the volume, thereby maintaining equal pressures in the housing chambers.

28 Claims, 12 Drawing Figures

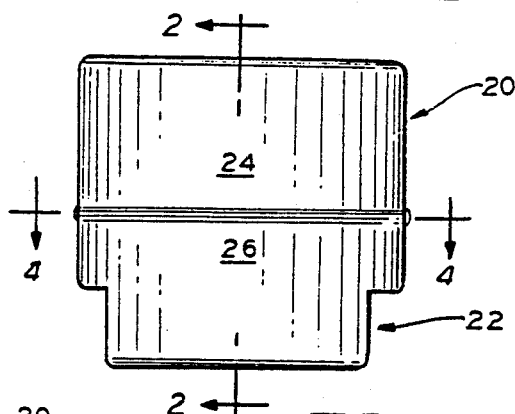
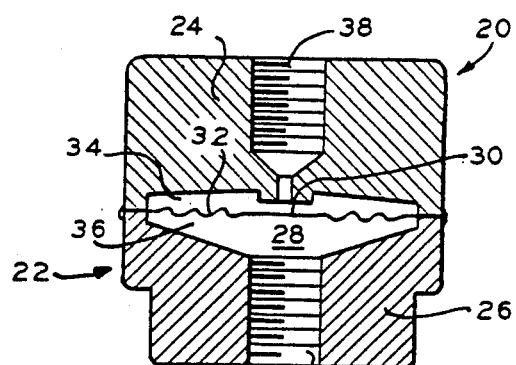
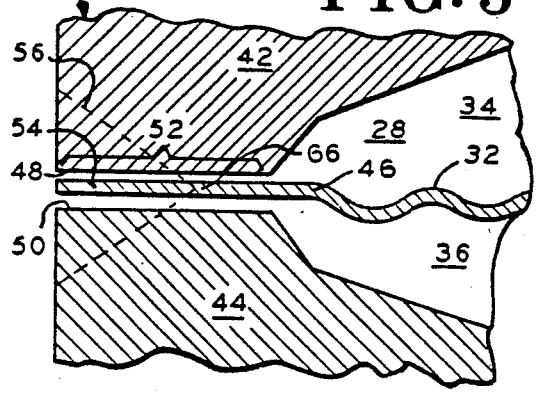
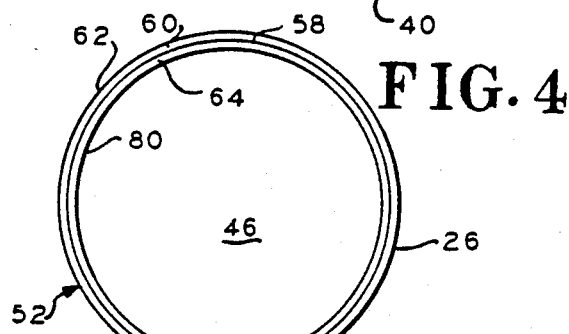
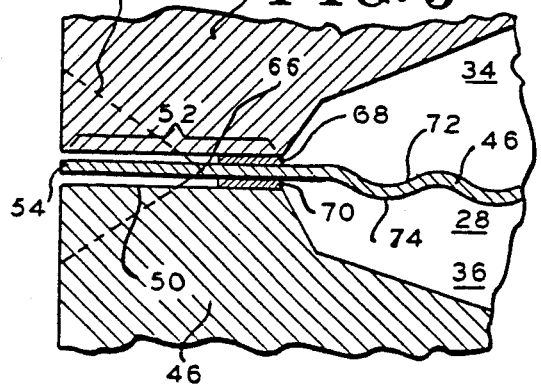
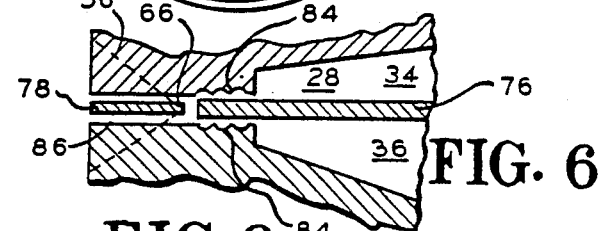
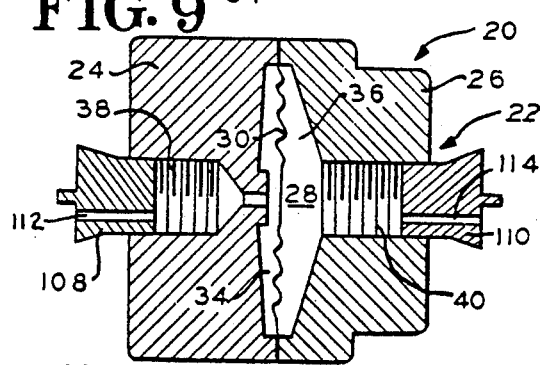
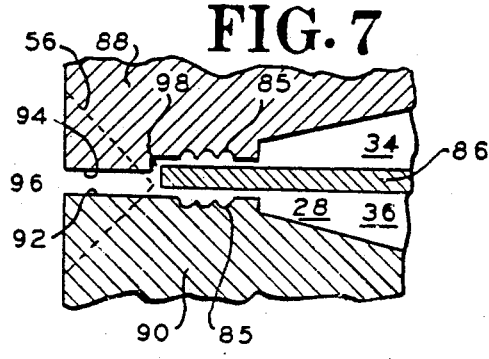
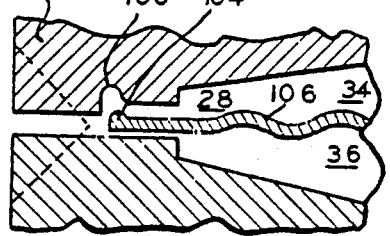

METHODS OF WELDING

CROSS-REFERENCE TO RELATED APPLICATION

This is a continuation-in-part application of Ser. No. 956,229, filed Oct. 30, 1978, now U.S. Pat. No. 4,265,389.

BACKGROUND OF THE INVENTION

This invention relates to a method of welding and, more particularly, a method of welding together to form a leak-proof and pressure-resistant seal of a member sandwiched between two weldable metallic work pieces.

The method of this invention has particular applicability to the assembly of devices intended to communicate pressure in fluid pressure-operated devices. Such devices are intended to transmit liquid or gas pressure, control the flow of liquids in hydraulic systems, prevent the extensive loss of liquids or gases in ruptured hydraulic or gaseous systems, and transmit pressure of liquids, solids, or gases to such liquid or gas-operated instruments as pressure gauges, indicators, recorders, pressure transmitters, flow valves, or the like. Examples of such devices are shown in U.S. Pat. No. 4,111,056 by the Applicant herein; by Green in U.S. Pat. No. 2,841,984; Bissell et al. in U.S. Pat. No. 3,202,063; and the like.

Such devices have in common a housing. The housing has therein a cavity. A diaphragm is within the housing cavity and divides the cavity into two chambers. The diaphragm is secured between sections of the housing. The securing of the diaphragm to the housing is of much concern.

One essential characteristic of such devices is that the diaphragm be held so securely in place that the fluid pressures upon the diaphragm will not break the diaphragm loose from the housing nor cause a rupture or leak in the housing at the juncture of the housing and diaphragm. It is also important that, when the housing and diaphragm are assembled, the diaphragm not be distorted by the joining process itself.

In the past, a number of proposals have been made to secure diaphragms in housings. Such methods of joining generally include welding, braising, or soldering. Thus, for example, Akeley, in U.S. Pat. No. 4,046,010, discloses a method of combining a diaphragm made of tantalum with a stainless steel weld ring and one side of a housing made of stainless steel. The stainless steel weld ring is welded directly to the stainless steel housing at a temperature above the melting point of the stainless steel, but below the melting point of the tantalum, whereby, simultaneous to the welding of the weld ring to the body, a braise is created between the tantalum diaphragm and both the stainless steel weld ring and the stainless steel body. However, the device taught by Akeley does not provide for a pressure-resistant seal, since the joining of the diaphragm to the weld ring and lower housing is the only connection. A braised joining is clearly weaker than welding, which is performed at much higher temperatures. Further, the upper housing of the device taught by Akeley abuts the weld ring and is merely clamped to the lower housing. It should be noted that Akeley requires the use of an elastomeric seal to buffer or keep the materials within the housing chamber from contacting the weld ring. The reason for this is that the weld ring is sensitive to, and may be corroded by, the substances within the chamber. It is clear, of course, that seals are subject to failure and that braising the diaphragm to a weld ring on only one side of a housing does not provide for a strong pressure-tight seal.

Another approach to joining a thin diaphragm to a housing is taught by Canonico et al. in U.S. Pat. No. 3,458,683. Canonico et al. discloses a thin metal foil positioned in a sandwich structure which is in face contact between the bottom metallic work piece and the top metallic retaining member. The sandwich-type structures are secured together by passing electron beams simultaneously through the top retaining member in a metallic foil and bottom work piece. Canonico et al. suggests that the foil member may be made of a material which is metallurgically incompatible with the top retaining member or bottom work piece, and particularly refers to the use of such materials as tantalum and the like. However, the weldment taught by Canonico et al. is perpendicular to the mating area before the foil and the housing. Accordingly, a pressure weld is not formed. In a setting of a pressure transducer or valve, pressure at the edges would become points of failure.

Further, it has been observed that prior consideration of welding techniques has specified that, in order to form a strong metallurgical bond, the mating surfaces must be placed into intimate contact and the weld strength be proportional to the surface areas joined and to the intimacy of contact. However, other characteristics are believed not to have been taken into account in the prior art devices. These observed characteristics, as more fully discussed hereinafter, may be employed to provide a pressure and seal tight weld. The disadvantages heretofore experienced of weak welds and the welding of dissimilar materials is, therefore, overcome.

SUMMARY OF THE INVENTION

It is an object of this invention to provide a method of welding a diaphragm to a housing wherein the diaphragm is sandwiched between two housing members;

It is an object of this invention to provide a method of welding, including the welding of dissimilar metals, which is inexpensive, efficient, and simple in effectuation;

It is an object of this invention to provide a method of welding a diaphragm to a housing and in which the diaphragm separates the housing into two chambers and in which the diaphragm is disposed in a vacuum chamber and in which gases are removed from the housing chambers without undesired distortion of the diaphragm;

It is an object of this invention to provide an improved method for welding thin diaphragms to another metal member;

It is another object of this invention to provide an improved method for welding thin diaphragms to another metal member when the two are metallurgically incompatible.

Other objects and advantages of the present invention will become apparent upon the reading of the following description thereof.

In accordance with the teachings of this invention, the method of welding comprises the steps of: providing at least two metallic work pieces; providing a member; sandwiching the member between the metallic work pieces; the juncture of the member and pieces defining the adjoining edges; selectively melting the metallic work pieces along their respective adjoining edges of the sandwich, thereby expanding the liquid metal; forcing the liquified metal of the metallic work pieces out of the sandwiches at the edges; and cooling the liquified portions of the work pieces to thereby cause the work pieces to solidify and draw together, thereby forming an impenetrable seal and pressure-resistent weld.

In another aspect of this invention, there is provided the method of welding in a vacuum chamber comprising providing a housing having a cavity therein. The housing is in two sections. There is further provided a diaphragm within the housing cavity. The diaphragm divides the cavity into two housing chambers. The combined housing and diaphragm are disposed in a vacuum chamber. Gases are evacuated from the vacuum chamber; pressures are maintained in each housing chamber in a predetermined relationship to one another during the gas evacuation and re-entry cycles to maintain the diaphragm in a predetermined position relative to the housing.

BRIEF DESCRIPTION OF THE DRAWING

FIG. 1 is a plan side view of a control device welded in accordance with the teachings of this invention;

FIG. 2 is a sectional schematic view of the device of FIG. 1, taken along lines 2—2;

FIG. 3 is a diagrammatic sectional and enlarged view of the juncture of the diaphragm and housing sections of the device of FIG. 2 and constructed in accordance with the teachings of this invention;

FIG. 4 is a section of the device of FIG. 1, taken along lines 4—4;

FIG. 5 is a diagrammatic sectional and enlarged view of another embodiment of the juncture of the diaphragm and housing portions constructed in accordance with the teachings of this invention;

FIG. 6 is a diagrammatic sectional and enlarged view of another embodiment of the juncture of the diaphragm and housing portions constructed in accordance with the teachings of this invention;

FIG. 7 is a diagrammatic sectional and enlarged view of another embodiment of the juncture of the diaphragm and housing portions constructed in accordance with the teachings of this invention;

FIG. 8 is a diagrammatic sectional and enlarged view of another embodiment of the juncture of the diaphragm and housing portions constructed in accordance with the teachings of this invention;

FIG. 9 is a diagrammatic view of an assembled housing for controlled welding in a vacuum in accordance with the teachings of this invention;

DESCRIPTION OF THE PREFERRED EMBODIMENTS

Figure 10:
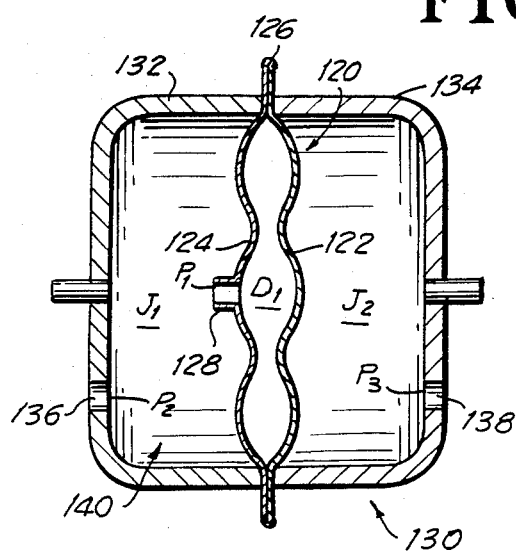
FIG. 10 is a diagrammatic sectional view of device constructed in accordance with the teachings of this invention.

Turning now to the drawing, there is generally disclosed a diaphragm seal 20. This device 20 is used to exemplify the welding method of this invention and is not restricted solely to seals. The diaphragm seal 20 may generally comprise a housing 22. The housing 22 may, in turn, be in two sections: an upper housing section 24 and a lower housing section 26.

The housing 22 may typically have, as shown here, a generally cylindrical shape, with the upper and lower housing sections 24 and 26 comprising substantially equal axial portions of the cylinder. The upper and lower housing sections 24 and 26 in cross section may have any convenient shape, such as circular, and may have formed therein radially extending depressions which, when joined, form a cavity 28 (FIG. 2). It will be noted that the cavity 28 may have a generally symmetrical shape extending radially from the axial center of the housing 22. Preferably, this shape is circular in cross section. A diaphragm 30 may be disposed within the cavity 28. The diaphragm 30 may be made of any well known flexible material, such as Teflon, rubber, or a thin planar sheet metal having therein a plurality of concentric corrugations 32 which extend uniformly both above and below the plane of the diaphragm 30. The diaphragm 30 is held in place by being sandwiched between the upper and lower housing sections 24 and 26, respectively. The diaphragm 30 divides the cavity 28 into upper and lower housing chambers 34 and 36, respectively. An upper housing port 38 may extend through the upper housing section 24 and into the upper housing chamber 34. A lower housing port 40 may extend through the lower housing 26 into the lower chamber 36. In general use, such a seal admits a process through the lower housing port 40 and into the lower chamber 36 of the cavity 28. In general use, the upper chamber 38 is filled with a liquid which communicates through the upper housing port 38 to a meter (not shown). The process, which may be a liquid, gas, or semi-solid, is inserted into the lower chamber 36. In diaphragm seal devices, the pressure exerted by the process is against the diaphragm which, in turn, transmits the pressure to the meter. In circumstances such as this, as in other devices that join a diaphragm member to a housing, it is essential that, at the juncture of the diaphragm 30 and the upper and lower housing 34 and 36, there must be both a leakproof and pressure-resistant engagement. To accomplish such a seal and pressure-resistant connection, a method of welding is applied.

Thus, there may be upper and lower housing sections 42 and 44, which are equivalent to the upper and lower housing sections 24 and 26, respectively, discussed above. It will be noted (FIG. 3) that disposed between the upper and lower housing sections 42 and 44 may be a diaphragm 46 which is similar in construction to the diaphragm 30 of the example of the assembled unit 20.

In the example presented here, the upper housing and lower housing sections 42 and 44, respectively, may have parallel and laterally extending surfaces 48 and 50, respectively. These surfaces 48 and 50 each define a housing seat 52. Sandwiched between these surfaces 48 and 50 may be a planar portion 54 of the diaphragm 46. The upper and lower housing sections 42 and 44 and diaphragm 46 may be of dissimilar materials. Thus, for example, the upper and lower housing sections 42 and 44, respectively, may be made of steel, nickel, stainless steel, Monel, Hastelloy, or the like.

The parallel surfaces 48 and 50 of the upper and lower housing sections 42 and 44, respectively, are, preferably, planar, parallel, and with a smooth finish, as by a lapping, or the like. The housings 42 and 44, with the diaphragm 46 sandwiched therebetween, are, preferably, clamped with sufficient pressure to prevent any gaps or spaces between the housing or work pieces and member 42, 44, and 46, respectively. The clamping pressure should not be so great so as to cause plastic flow of the diaphragm 46. The seal 20, or similar device, may then be welded with any suitable means, such as electron beam welding in a manner ordinarily known in the art. The beam is, preferably, directed parallel to the plane of the diaphragm 46. The angle of penetration and depth of penetration are indicated by the dashed lines 56. The clamping effect provides constant pressure perpendicular to the parallel surfaces 48 and 50. As the metals 42, 44, and 46 become molten, or liquid, in the volume of the electron beam 56, the clamping effect combined with the expansion effect of the liquified metal forces this molten metal outwardly from the housing 22. The electron beam is then removed and the rapid cooling causes a natural shrinkage or reduction in volume. This lost volume causes the entire assemblage of parts 42, 44, and 46 to be drawn together more tightly and securely than has heretofore been possible. In other words, the clamping pressure becomes an integral part of the device 20 to thereby form a seal and pressure-resistant weld.

It is essential, in performing this welding, that the beam does not extend the full depth of the parallel surfaces 48 and 50 of the housing sections 42 and 44, respectively. Moreover, penetration of the electron beam is determined by the density of the object to be welded. If a beam is brought too close to the cavity 28, the beam may enter the cavity 28 and burn out the diaphragm 46. Thus, the preferred depth may be seen by the concentric circle 58 (FIG. 4). The area 60 is that portion subjected to welding and extends inwardly from the outer surface 62 of the housing 22. The area 64 is that portion of the seat 52 proximate to the cavity 28 which is not welded. Thus, the circle 58 is the preferable line of greatest depth of the weld and is coincident with the apex 66 of the dashed weld area 56 (FIG. 4).

Frequently, diaphragms are provided with gaskets made of such materials as Teflon. Typically, Teflon is baked onto the diaphragm for use as an additional seal against leakage. Such a gasket may also be used to eliminate the step of lapping the opposed parallel housing surfaces. In addition, the use of Teflon, or the like, is frequently in connection with coating to protect diaphragms against the materials which come into the device cavity (FIG. 5). In order to effectuate the method of welding with coated gaskets, a diaphragm 46 may be provided with gaskets 68 and 70 on opposed sides 72 and 74, respectively, of the diaphragm 46. These opposed gaskets 68 and 70 are, preferably, located within the seating area 52 defined by the opposed parallel surfaces 48 and 50 of the upper and lower housing sections 42 and 44, respectively. In the alternative, only one of the gaskets 68 or 70 may be used. Preferably, the gasket coating should be secured, as by baking, or the like, onto the diaphragm 46 at a temperature of approximately 700° F. The gaskets 68 and 70, however, are spaced from the welding area 60, but within the seating area 62 at a point where the temperature of the electron beam is sufficiently low, so that the gaskets 68 and 70 will not be damaged. The welding step is then performed as before, and the resulting clamping pressure compresses the Teflon gaskets 68 and 70, creating the additional seal against leakage. It has been determined that the preferable thickness of the diaphragm 46 is 0.004 inches and that the coated area has an overall thickness of 0.005 inch. This allows a space of 0.001 inch for the compression of the Teflon gaskets 68 and 70. The Teflon gasket 68 and 70 is believed to compress at approximately 25% to 50% of its original thickness. This leaves approximately 0.005 to 0.00075 inch space for the molten metal to flow into, causing additional weld shrinkage and greater pressure at the seal area 62.

On occasion, it may be desirable to use a diaphragm made of a non-weldable material, such as an elastomer of plastic. In order to provide the necessary welded-in clamping pressure, the diameter of the diaphragm 76 (FIG. 6) is smaller than the diameter of the diaphragm 46 discussed above. A weldable spacer ring 78 is disposed about the circumference of the diaphragm 76. As before, upper and lower housing sections 80 and 82, respectively, have parallel spaced, laterally extending surfaces 84 and 86, respectively, for engaging both the diaphragm 76 and the spacer ring 78.

The diaphragm 76 is, preferably, 0.001 inch thicker than the spacer ring 78. When the diaphragm 76 is provided with a baked-on gasket (not shown), the diaphragm total thickness should be approximately 0.0015 inch thicker than the spacer ring 78 to allow for gasket compression, as indicated above.

It is preferable that when non-metal diaphragms are employed, such as those made totally of Teflon, grooves 85 be provided in the non-welded seat area 64 to allow the material from the diaphragm 76 to flow therein during the compression phase of the welding. In addition, the diaphragm may be molded to have ridges that complement the grooves 85. In such circumstances, it is necessary that the diaphragm 76 be thicker than the spacer ring 78 so as to allow enough material to be clamped in the grooves 85 during the assembly and clamping operations. Welding may be accomplished in the same method as indicated above.

In still another embodiment of this invention (FIG. 7), a diaphragm 86 may have a smaller diameter than the seat 52. The upper or lower housing sections 88 or 90, respectively—in this example, the upper housing section 88—may have a stepped configuration. Abutting parallel surfaces 90 and 92 of the sections 88 and 90 define the weld area 60. At the circumferential edge 96 of the diaphragm 86, the upper housing section 88 is stepped, thereby providing a complementary circumferential wall 98. This wall 98 and edge surface 96 abut at the line 58, demarcating the weldable from the non-weldable areas 60 and 64 of the housing seat 52. A malleable non-metallic diaphragm (not shown) may be accommodated and flowed into grooves 84 in the upper and lower housing sections 88 and 90, respectively. It is also believed possible to secure a flat, planar elastomer diaphragm in a similar manner.

The diaphragm 86 may be metallic foil. In such a case, the grooves 86 will not be necessary. In this case, the preferred height or thickness of the step or wall 98 is 0.001 inch less than the thickness of the diaphragm 86 and is, preferably 0.01 inch greater in diameter. If, in this example, the diaphragm 86 is 0.004 inch thick, the depth of the recessed portion should be 0.003 inch thick. Sufficient clamping pressure should be applied to the diaphragm 86 to compress the metal foil so as to obtain the metal-to-metal contact for welding. During the clamping process, as the metal foil diaphragm 86 is compressed, it will expand outwardly into the extra space provided in the stepped area 64.

As an alternative embodiment to the cast ridges 84 (see FIG. 6 for example), it is possible to provide an indentation or mating groove 100 in one of the housing sections—in this case, the upper housing section 102—to match a molded rim portion 104 of a diaphragm 106 (FIG. 8).

One of the important features of this invention is the ability to weld together, by electron beam welding, a tantalum diaphragm to dissimilar metal housing. Using the configuration discussed in connection with FIG. 3, the electron beam welding is performed as discussed above. It is believed that molecules of the tantalum diaphragm 46 disperse in the steel housings 36 and 38, providing a strong weld. It is also understood that the precise shape of the weld is only for demonstrative purposes. It has been found, however, that the wider the weld (i.e., above and below the seat 52), the stronger will be the weld. Indeed, it has been observed that there are several features which are significant in controlling the strength of the weld and the integrity of the seal. Thus, the strength of a welded joint is found to be proportional to the surface areas joined, to the intimacy of the contact areas, the clamping pressure, the weld width, and the penetration depth. It is believed that the amount of clamping pressure necessary and width of the weld area at the entrance into the housing are two factors which have not been fully considered before and not taken fully into account until the method discussed hereinabove.

Still another difficulty in properly welding by the electron beam method is the necessity of removing gases from the welding chamber. The difficulty arising is that during gas removal, any differential pressure within the cavity 28 may cause the diaphragm 30 to move, thereby distorting and permanently damaging it. Control of the gas removing process is a method protecting the diaphragm 30. As shown (FIG. 9), the housing 22 is disposed with jigs or plugs 108 and 110 in the ports 38 and 40, respectively. The jigs 108 and 110 are intended for rotating the housing 22 during welding. It will be observed that the volume of the upper chamber 34 is smaller than the volume of the lower chamber 36. It is clear that the simultaneous removal of gases from both chambers 42 and 44 would cause an imbalance in the pressure in the cavity 28 and a distortion of the diaphragm 30. To overcome this, the jigs 108 and 110 are inserted into the ports 38 and 40. Apertures or flow holes 112 and 114 are provided in each of the jigs 108 and 110, respectively. The flow holes 112 and 114 are proportional to the desired flow of gases out of the cavity 28. Thus, for example, if the volume of the upper housing chamber 34 is half the size of the volume of the lower housing chamber 36, then the flow hole cross-sectioned areas should have the same ratio. Conversely, if it is desired to position the diaphragm 30 in some other position than a planar position, that may be determined by adjusting the relative size of the flow holes so as to control the rate of flow from the chamber 28.

In an extension of the foregoing method of welding a diaphragm in a vacuum chamber, a more complex diaphragm, or similar devices, may be welded by determining the proportions of apertures.

Thus, for example, it is well known to join together disc-shaped diaphragms to form or define therebetween a chamber. Such a diaphragm is shown in section in FIG. 10 and is generally referred to as a capsule. Such diaphragm capsules 120 are well known devices frequently used in low pressure measurement devices (not shown). Generally, they comprise two disc-shaped diaphragms 122 and 124 welded or otherwise joined at the periphery 126. Access is provided to the capsule through a port 128, which is placed at the center of one of the diaphragms 124.

In welding such diaphragms 122 and 124 together in a vacuum chamber (not shown), a difficulty is encountered. As the gases are removed or returned to the vacuum chamber 125, the unequal rush causes damage to the fragile diaphragms 122 and 124.

Figure 11:
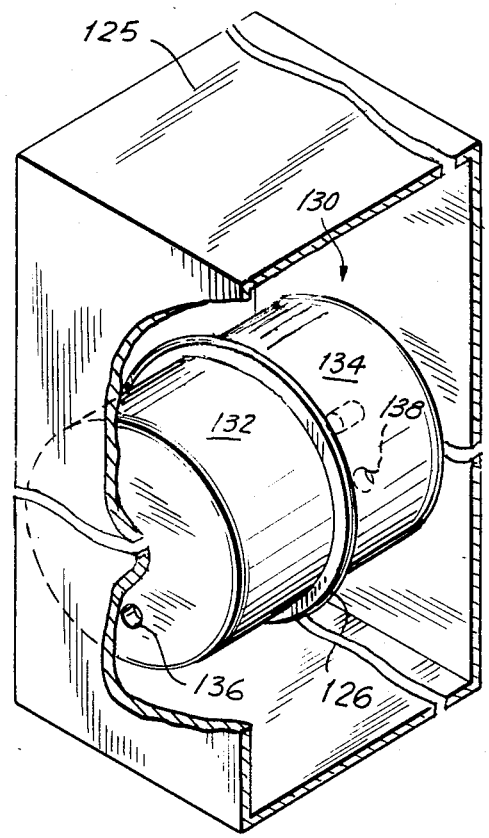
FIG. 11 is a perspective view of the device of FIG. 10.

This disadvantage is overcome by placing the diaphragms 122 and 124 into a jig 130 (FIGS. 10 and 11). The jig 130 may be comprised of two cup-like parts 132 and 134. Ports 136 and 138 are provided, one port into each section 132 and 134, respectively, of the jig 130.

It has been determined that, by adjusting the cross-sectional areas of the port openings 128, 136, and 138, the flow of gases before and after the welding process can be controlled so as to avoid damage to the diaphragm members 122 and 124.

To determine the proper proportions, it will be observed that the diaphragms 122 and 124 divide the jig chamber 140 into three volumes: two jig volumes $J_1$ and $J_2$ and a diaphragm chamber $D_1$. When the cross-sectional area $P_1$ of the diaphragm port 128 is known and the volume of the jig $J_1$, into which the diaphragm port 128 exits is known, the cross-sectional area $P_2$ of the jig port 136, which communicates with the first jig volume $J_1$, may be determined by the formula:

$$P_2 = \frac{(P_1)(J_1)}{D_1}$$

From this determination, one may then determine the cross-sectional area $P_3$ of the port 138, which communicates with the second jig volume $J_2$, according to the formula:

$$\frac{(P_1)(J_1)/D_1}{J_1 + D_1} \times J_2 = P_3$$

when the second jig volume $J_2$ is known. As a consequence, it has been observed that the flow of gases into and out of the jig and diaphragm unit is such that distortion is avoided.

Figure 12:
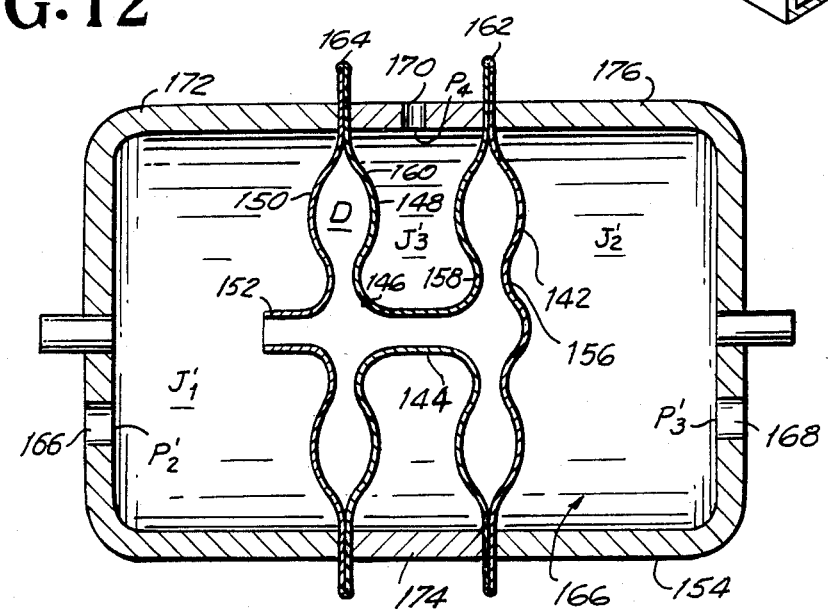
FIG. 12 is a diagrammatic sectional view of another embodiment of this invention.

This principle may be extended to dual diaphragm capsules or larger numbers of capsules. It is well known to "gang" capsules together to form even more sensitive units. In such a device, for example, there may be two capsules ganged together. Thus, as shown in FIG. 12, one capsule 142 has a centrally disposed port 144, as in the previous capsule (FIG. 10). That port 144 is connected to a port opening 146 at the symmetrical center of another capsule 148. The closing diaphragm 150 of the second capsule 148 has a symmetrically disposed port 152.

An enclosing, cup-shaped jig 154 is intended to hold the two separate diaphragm members 156 and 158 of the first capsule 142 and the two separate diaphragm members 150 and 160 of the second capsule 148 so that the circumferential marginal edges 162 and 164 of each capsule 142 and 148, respectively, may be welded.

The capsules 142 and 148 in the jig 154 divide the internal volume 166 into four distinct volumes: $J'_1$, $J'_2$, $J_3$, and D. The volume $J'_1$ is the jig volume defined by the diaphragm 150 of the second capsule 148 having the central port 152. The volume $J'_2$ is the volume defined by the closed diaphragm 150 of the first capsule 142 of the jig 154.

Volume $J_3$ is the jig volume defined by the space between the two interconnected capsules 142 and 148. D is the volume of the capsules 142 and 148.

Each part of the jig 154 has an appropriate port 166, 168, and 170 into the defined jig volumes J'₁, J'₂, and J₃. The cross-sectional areas P'₂, P'₃, and P₄ of the ports 166, 168, and 170, respectively, may be determined by applying the relationship set forth above. Thus, first P'₂ is determined; then P'₃ is determined, as before. The cross-sectional area P₄ of the third jig port 170 may then be determined by applying the same relationship to determine the cross-sectional area of the second aperture 168 into the jig 154. The following relationship can be used to determine the cross-sectional area P₄ of the third jig port 170:

$$(P_3/J_2) = (P_4/J_3)$$

Obviously, if further capsules are to be welded in a ganged relationship, the cross-sectional area of further apertures may be determined by following this relationship.

It will be noted that the jig 154 is effectively divided into three parts: 172, 174, and 176. The outer parts, 172 and 176, may be cup-shaped. The part 174 between the two capsules 142 and 148 is in the form of a cylinder, which is split into two parts, so that, when the welding is completed, the cylinder 170 may be separated and removed. If this is not done, this part of the jig 154 will be welded into a fixed position.

The control of the flow of gases into and out of the jig for the purpose of welding a single diaphragm, capsules, or any other device, is intended to prevent distortion of the item being welded due to the unequal pressures caused by the withdrawal and re-entry of the gases. It should also be understood that the dimensions of the ports in the jig and, where applicable, the device to be welded, may be so adjusted as to cause a distortion of the device in such a manner as to produce a desired result. Thus, for example, when a diaphragm is being welded to a housing (FIG. 1), the diaphragm may be distorted in a predetermined position by selecting flow holes of a desired cross-sectional area. So, too, a device being welded in a jig may be similarly distorted into a predetermined configuration.

What is claimed is:

1. The method of welding, comprising:
   (a) providing at least two housing sections with inner and outer peripheral edges and planar parallel surfaces therebetween;
   (b) providing a diaphragm with a planar peripheral portion for being held by at least a part of the parallel surfaces of the housing sections;
   (c) sandwiching the diaphragm between at least the two housing sections;
   (d) selectively melting the housing sections along the outer peripheral edges of the sandwich, thereby expanding the liquid metal; the step of melting includes electron beam welding
   (e) forcing the liquified metal of the housing sections out of the sandwich at the edges by the clamping of the housing sections to provide a component of force perpendicular to the sandwich edges
   (f) cooling the melted portion of the sandwich to thereby cause the housing sections to solidify and draw together, forming an impenetrable seal and pressure-resistant weld.

2. The method of welding, as recited in claim 1, wherein the step of providing the planar portion of the diaphragm includes providing a diaphragm so dimensioned that its peripheral edge coincides with the outer peripheral edge of the housing sections, and the step of welding includes welding a volume of the housing defined by a weld area above and below the plane of the diaphragm and along the outer peripheral edge of the housing and a part of the distance from the outer to the inner housing sections' peripheral edges.

3. The method of welding, as recited in claim 2, wherein the step of providing a diaphragm includes providing a metallic diaphragm with an integrally formed gasket on at least one side of the diaphragm and extending inwardly of the parallel housing surfaces in the area of the housing surfaces not within the weld volume.

4. The method of welding, as recited in claim 3, wherein the step of providing a diaphragm includes providing a diaphragm with a gasket integrally formed to both sides of the diaphragm.

5. The method of welding, as recited in claim 2, wherein the step of providing a diaphragm includes providing a diaphragm of tantalum, and the step of welding includes welding at a temperature high enough to cause the molecules of tantalum to diffuse into the housing sections, and the step of providing housing sections includes providing non-tantalum metal housing sections.

6. The method of welding, as recited in claim 5, wherein the step of providing housing sections includes providing steel housing sections.

7. The method of welding, as recited in claim 2, wherein the step of providing a diaphragm includes providing a diaphragm with an outer periphery within and between the parallel surfaces of the housing sections and spaced from the outer periphery of the housing sections and substantially outside the weld volume area.

8. The method of welding, as recited in claim 7, further comprising the providing of a weldable metallic member for surrounding the diaphragm and extending within the parallel spaced surfaces and in the weld volume.

9. The method of welding, as recited in claim 8, wherein the step of providing a weld member includes providing a weld ring made of weldable metal.

10. The method of welding, as recited in claim 9, wherein the step of providing a diaphragm includes providing a diaphragm of a maleable non-metallic member, and the step of providing the housing sections includes providing grooves in the housing surfaces mating with the diaphragm for receiving therein the diaphragm member under the clamping and welding pressures.

11. The method of welding, as recited in claim 7, wherein the step of providing housing parallel surfaces includes providing a stepped surface in at least one of the housing section surfaces so that the surfaces of the housing sections abut each other in the weld volume and receive the diaphragm in the unwelded volume.

12. The method of welding, as recited in claim 11, wherein the step of providing housing sections with parallel surfaces includes providing grooves in at least one of the surfaces engaging the diaphragms; the step of providing the diaphragm includes providing a diaphragm, at least a part of which is made of a non-metallic malleable material such that, upon clamping and welding, a part of the material flows into grooves.

13. The method of removing or supplying gases in a vacuum welding chamber, comprising:

(a) providing a housing having at least two sections with portals into the sections;

(b) providing a member to be welded between the two sections; the two sections defining a cavity within the housing; the member dividing the housing cavity into at least two chambers;

(c) disposing the member and housings into a vacuum welding chamber;

(d) removing gases from the vacuum chamber prior to welding;

(e) supplying gases to the vacuum chamber after welding;

(f) maintaining predetermined pressure relationships between the housing chambers during the removal or supply of the gases to thereby dispose the member in a predetermined position with reference to the housing.

14. The method of removing or supplying gases, as recited in claim 13, wherein the step of maintaining the pressure relationships in the housing chambers includes dimensioning the portal openings so as to control the flow of gases and thereby maintain predetermined pressure relationships of the gases in one chamber with respect to the other chamber.

15. The method of removing or supplying gases, as recited in claim 14, wherein the step of providing portal openings includes dimensioning the cross-sectional area of each of the openings to be in the same proportions to one another as the volume of the respective chambers to which each portal is connected are to each other so that the rate of flow of gases through the portals is in the same proportion as the volumes of the chambers are to one another.

16. The method of determining the dimensions of removing and restoring gases to a jig in a vacuum welding chamber so as not to damage fragile parts, comprising:

(a) providing at least two parts;

(b) placing the two parts together for welding, the two parts defining therebetween a part chamber;

(c) providing said two parts within the vacuum welding chamber;

(d) providing the two parts with at least one port into the port chamber, the part having a known cross-sectional area;

(e) providing a jig of at least two sections which together define a jig volume;

(f) providing the jig with at least a first and second jig port;

(g) placing the parts between the sections so that the port of the part is within the jig volume and the parts separate the jig volume into three volumes and the jig ports are in different jig volumes;

(h) determining the volume of one of the jig volumes into which the part port exits;

(i) selecting the cross-sectional area of the first jig port so as to be equal to the cross-sectional area of the part port multiplied by the volume of the jig into which the part port exits divided by the volume of the part chamber;

(j) selecting the cross-sectional area of the second jig port such that it is equal to the cross-sectional area of the first jig port multiplied by the volume of the second jig volume and divided by the sum of the part volume and the first jig volume thereby causing the flow of gases into and out of the jig chamber volumes to maintain equal pressures therein.

17. The method recited in claim 13 wherein the step of providing a member comprises providing two members.

18. The method recited in claim 17 further comprises welding the two members together.

19. The method recited in claim 13 further comprises the step of welding the member to at least one section.

20. The method recited in claim 19 further comprises the step of welding the member to the two sections.

21. The method as recited in claim 13 wherein the step of maintaining predetermined pressure relationship includes preventing the member from being deformed.

22. The method as recited in claim 19 wherein the step of maintaining predetermined pressure relationship includes preventing the members from being deformed.

23. The method as recited in claim 13 wherein the step of maintaining predetermined pressure relationship includes causing the member to deform into a predetermined configuration.

24. The method as recited in claim 19 wherein the step of maintaining predetermined pressure relationship includes causing at least on of the members to deform into a predetermined configuration.

25. The method of determining the dimensions of removing and restoring gases to a jig in a vacuum welding chamber so as not to damage fragile parts, comprising;

(a) providing at least two parts;

(b) placing the two parts together for welding, the two parts defining therebetween a part chamber;

(c) providing the two parts within the vacuum welding chamber;

(d) providing the two parts with at least one port into the part chamber, the port having a known cross-sectional area;

(e) providing a jig of at least two sections which together define a jig volume;

(f) providing the jig with at least a first and second jig port;

(g) placing the parts between the sections so that the port of the part is within the jig volume and the parts separate the jig volume into three volumes and the jig ports are in different jig volumes;

(h) determining the volume of one of the jig volumes into which the part port exits;

(i) selecting the cross-sectional area of the first jig port so as to be equal to the cross-sectional area of the part port mutiplied by the volume of the jig into which the part port exits divided by the volume of the part chamber;

(j) selecting the cross-sectional area of the second jig port such that its area to the cross-sectional area of the first jig port multiplied by the volume of the second jig volume and divided by the sum of the part volume and the first jig volume causing the flow of gases into and out of the jig chamber volumes to create unequal pressures therein to distort the parts in a predetermined configuration.

26. A diaphragm seal constructed by any one of the methods described in claims 1 or 3 through 15 or 17 through 24.

27. A diaphragm capsule constructed by any one of the methods described in claims 16 or 25.

28. The method of welding, as recited in claim 1, wherein the step of melting includes electron beam welding at least a part of the housing at the outer peripheral edges.

* * * * *